United States Patent
Kudo

(10) Patent No.: US 8,107,096 B2
(45) Date of Patent: Jan. 31, 2012

(54) PRINTER COMMUNICATING USING FILE SHARING PROTOCOL

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 866 days.

(21) Appl. No.: 12/076,884

(22) Filed: Mar. 25, 2008

(65) Prior Publication Data
US 2008/0239389 A1 Oct. 2, 2008

(30) Foreign Application Priority Data
Mar. 29, 2007 (JP) ................................. 2007-089328

(51) Int. Cl.
*G06F 3/12* (2006.01)
(52) U.S. Cl. ...... 358/1.13; 358/1.15; 358/402; 358/403; 709/203; 709/220
(58) Field of Classification Search .................. 358/402, 358/403, 1.15, 1.16, 1.13; 709/203, 220
See application file for complete search history.

(56) References Cited

U.S. PATENT DOCUMENTS

| | | | | |
|---|---|---|---|---|
| 5,732,403 A * | 3/1998 | Nakamura | ..................... | 715/209 |
| 5,790,853 A * | 8/1998 | Nomura et al. | ............... | 718/104 |
| 6,115,739 A * | 9/2000 | Ogawa et al. | ................. | 709/215 |
| 6,385,654 B1 | 5/2002 | Tanaka | | |
| 7,061,633 B1 * | 6/2006 | Shima | ......................... | 358/1.15 |
| 7,281,049 B2 * | 10/2007 | Verma et al. | .................... | 709/229 |
| 7,933,033 B2 * | 4/2011 | Ohishi et al. | ................. | 358/1.15 |
| 2003/0072031 A1 | 4/2003 | Kuwata et al. | | |
| 2003/0234957 A1 * | 12/2003 | Ohara | ......................... | 358/1.15 |
| 2004/0257613 A1 * | 12/2004 | Okabe et al. | ................. | 358/1.15 |
| 2004/0257614 A1 | 12/2004 | Tanimoto | | |

(Continued)

FOREIGN PATENT DOCUMENTS

CN 1669804 A 9/2005

(Continued)

OTHER PUBLICATIONS

CN Office Action dtd Sep. 18, 2009, CN Appln. 200810087463.0, English Translation.

(Continued)

*Primary Examiner* — Twyler Haskins
*Assistant Examiner* — Dennis Dicker
(74) *Attorney, Agent, or Firm* — Banner & Witcoff, LTD.

(57) ABSTRACT

A printer may be connected with an information processing device in a communicable manner. The printer includes a first command receiving device, a job directory creating device, a storage device, and an address sending device. The first command receiving device receives a job creating command including first print data. The first print data includes a plurality of second print data. The job directory creating device creates a job directory address in the case where the job creating command is received by the first command receiving device, and creates a file address for each of the plurality of second print data included in the first print data. Each of the created file addresses includes the created job directory address as its superior address. The storage device stores the job directory address and the file addresses created by the job directory creating device. The address sending device is capable of sending the job directory address and the file addresses stored in the storage device to the information processing device by using a file sharing protocol.

11 Claims, 16 Drawing Sheets

U.S. PATENT DOCUMENTS

| | | |
|---|---|---|
| 2005/0057771 A1 | 3/2005 | Ohishi et al. |
| 2005/0206956 A1 | 9/2005 | Hagiwara |
| 2011/0188084 A1* | 8/2011 | Ohishi et al. .................. 358/1.16 |

FOREIGN PATENT DOCUMENTS

| | | |
|---|---|---|
| JP | 11-154066 | 6/1999 |
| JP | 2001143657 A | 5/2001 |
| JP | 2001-160882 | 6/2001 |
| JP | 2001-175622 | 6/2001 |
| JP | 2002373064 A | 12/2002 |
| JP | 2005010857 A | 1/2005 |
| JP | 2005063421 A | 3/2005 |
| JP | 2006270403 A | 10/2006 |

OTHER PUBLICATIONS

European Search Report issued in European Patent Application No. EP 08251189.0-1245/1975777, dated Nov. 25, 2008.

JP Office Action dtd Jun. 7, 2011; JP Application No. 2007-089328; English Translation.

* cited by examiner

US 8,107,096 B2

PRINTER COMMUNICATING USING FILE SHARING PROTOCOL

CROSS-REFERENCE TO RELATED APPLICATION

This application claims priority to Japanese Patent Application No. 2007-089328, filed on Mar. 29, 2007, the contents of which are hereby incorporated by reference into the present application.

BACKGROUND OF THE INVENTION

1. Field of the Invention

The present invention relates to a printer that is capable of communicating with an information processing device using a file sharing protocol.

2. Description of the Related Art

A printer that can be connected to an information processing device, such as a personal computer, and capable of communicating with the information processing device is known. The printer is capable of receiving print orders from the information processing device and performing printing. For example, the information processing device converts data to be printed into bit-mapped data that can be printed by the printer. Then, the information processing device sends the bit-mapped data and a print order command to the printer. The printer creates and executes a print job. The print job is executed in accordance with each of the print order commands sent from the information processing device. Furthermore, the print job means a process of receiving and printing the print data that is sent along with the aforementioned print order command.

A printer that is capable of sending data regarding the print job of the printer to the information processing device is known. US Patent Application Publication No. 2003/0234957 discloses a printer that sends HTML data in the case where the printer receives a demand for a status tracking page. The aforementioned HTML data includes status information of the print job and print pages included in the print job. Based on the received data, the information processing device is able to display the status information of the print job and the print pages with a web browser. The user may view the status tracking page on the web browser, acknowledge the condition of the print job and the print pages which the user has instructed for printing.

BRIEF SUMMARY OF THE INVENTION

In the technique disclosed in the aforementioned prior art, the information regarding the print job is communicated between the information processing device and the printer by using the HTTP protocol. The user is able to acknowledge the information regarding the job which the user instructed for printing. This is possible not only at a unit of print jobs, but also at a unit of print pages included within the print job. However, this method may not be the best way to provide the user with information regarding print jobs.

The technique disclosed in the present specification provides information to the user regarding print jobs by applying a useful and novel technique. It may be beneficial if information regarding a print job is provided at a unit that is smaller than the unit of the print job. The inventor of the technique disclosed in the present specification concluded that such information should be configured in a hierarchical structure; a superior level and a subordinate level. For instance, within a unit constituting a superior level (for example, a print job), a unit constituting a subordinate level (for example, a page to be printed) may be included.

A typical OS that is installed in an information processing device generally administers various data under a hierarchical structure. Hence, a directory (folder) which is a superior level, and a file which is a subordinate level exist. Hence, in the case where a directory address and a file address that is subordinate to the aforementioned directory address are known, the information processing device can display an object of the directory and an object of the file in a hierarchical structure. The technique disclosed in the present specification is devised by the inventor based on the conception that the print job and the smaller units included therein may be indicated on the information processing device using a hierarchical relationship that exists therebetween. With the technique disclosed in the present specification, the information regarding print jobs is expressed in a hierarchical structure that can be seen with the relationship of the directory and its files contained therein. With such a configuration, it is expected that the user can easily acknowledge the relationship of the print job and smaller units included in the print job.

The inventor of the technique disclosed in the present specification found that, in order to indicate the information regarding print jobs on the information processing device using the hierarchical relationship of the directory and files, the application of a file sharing protocol is useful. The typical OS installed within the information processing device is capable of processing communication by using the file sharing protocol. One example of the file sharing protocol commonly supported by the typical OS is a WebDAV protocol (Web Distributed Authoring and Versioning protocol). For instance, Windows (registered trademark) of Microsoft supports the WebDAV protocol. The information processing device is capable of receiving a directory address and a file address by using the WebDAV protocol. The information processing device acknowledges the existence of directories and files by receiving their addresses, and indicates the objects that correspond to the directories and files. The inventor of the technique disclosed in the present specification had found that the information regarding print jobs could be indicated on the information processing device with the application of the file sharing protocol.

One technique disclosed in the present specification is a printer that communicates with an information processing device. The printer may comprise a first command receiving device, a job directory creating device, a storage device and an address sending device. The first command receiving device receives a job creating command including first print data. The first print data may be data that is instructed for printing in a single job creating command (print instruction command). The first print data may be text data or image data. Furthermore, the first print data may be data that has been converted into a bit-mapped data format, or data that is not yet converted into the bit-mapped data format, such as a postscript format or the like. In the latter case, the printer may be installed with a printer driver that converts the data format of the received first print data into the bit-mapped data. Furthermore, the first print data may include a plurality of second print data. The second print data is composed at a predetermined unit. The second print data may be composed of a granular unit of which the print process is executed.

In the case where the job creating command is received by the first command receiving device, the job directory creating device may create a job directory address. The created job directory address is stored in the storage device. The job directory address is created to correspond to each of the job creating commands that have been sent from the information processing device. For instance, if the printer simultaneously receives a plurality of job creating commands, a plurality of job directory addresses, each corresponding to the job creating commands respectively, is created at that time. In this case, each of the job directory addresses may be identified by a unique address which corresponds to each of the print job creating commands.

There are cases where the first print data received along with the job creating command includes a plurality of second print data. In this case, the job directory creating device may further create file addresses for each of the second print data included in the first print data. The file address includes the job directory address also created by the job directory creating device as its superior address. In other words, the file address is a subordinate address of the created job directory address. Each of the file addresses corresponds to each of the second print data respectively. For instance, if a plurality of second print data exists as the subordinate objects of one job directory address, a plurality of file addresses, each including the aforementioned job directory address as the superior address and identified by a unique address, is created. The created file address is stored in the storage device.

As mentioned before, the second print data is composed at a predetermined unit. Hence, the first print data is an assembly of second print data of the predetermined unit. The predetermined unit is not restricted so long as it is a unit which comprises a part of the first print data. For instance, the first print data can be divided into smaller fractions if the predetermined unit is pages to be printed. In this case, if the first print data consists of three pages, the aforementioned first print data is composed of three pieces of second print data. Furthermore, in the case of using pages to be printed as the predetermined unit, first print data including contents that are less than one page would be composed of one piece of second print data. The second print data may be created by the information processing device before being sent to the printer. Furthermore, if the printer is installed with the printer driver, the printer may create the second print data after the print data is received.

The address sending device may use a file sharing protocol to send data to the information processing device. Thus, the address sending device is capable of sending the job directory address and the file address stored in the storage device to the information processing device by using the file sharing protocol. As mentioned earlier, the file address includes the job directory address as its superior address. Hence, the information processing device is able to acknowledge the job directory and the subordinate files of this job directory. Thus, the information processing device is able to indicate a job directory object that corresponds to the print job to be executed within the printer, and file objects that correspond to the smaller units included in the print job by using a hierarchical structure. The user is able to easily recognize the relationship of the print job and their details, such as the print pages included therein.

The term "sending an address" used in the present specification should be interpreted broadly. For instance, in the case where the job directory address is identified as "aaa", and the file address including the aforementioned print job directory as its superior address may be identified as "aaa/bbb/ccc", the term "sending an address" is not restricted merely to a case of sending the address of "aaa/bbb/ccc". The term "sending an address" may further be applied to cases of sending only parts of the subordinate addresses (which would be a case of sending "bbb/ccc" or "ccc" in the aforementioned example). The term "sending an address" is defined to include a case of sending the absolute or full address and also a case of sending the relational address, or the subordinate address that is subject to the dominant address.

DETAILED DESCRIPTION OF THE PREFERRED EMBODIMENTS

An embodiment will be described with reference to figures. In the following description, document data or image data sent from an information processing device to a printer in order to be printed will be termed "print data", and a process for printing the print data in accordance with a job creating command sent once from the information processing device to the printer as a print command will be termed a "job". Further, in the following description, a job directory address, a document directory address, and a file address may collectively be termed "address data".

Figure 1:
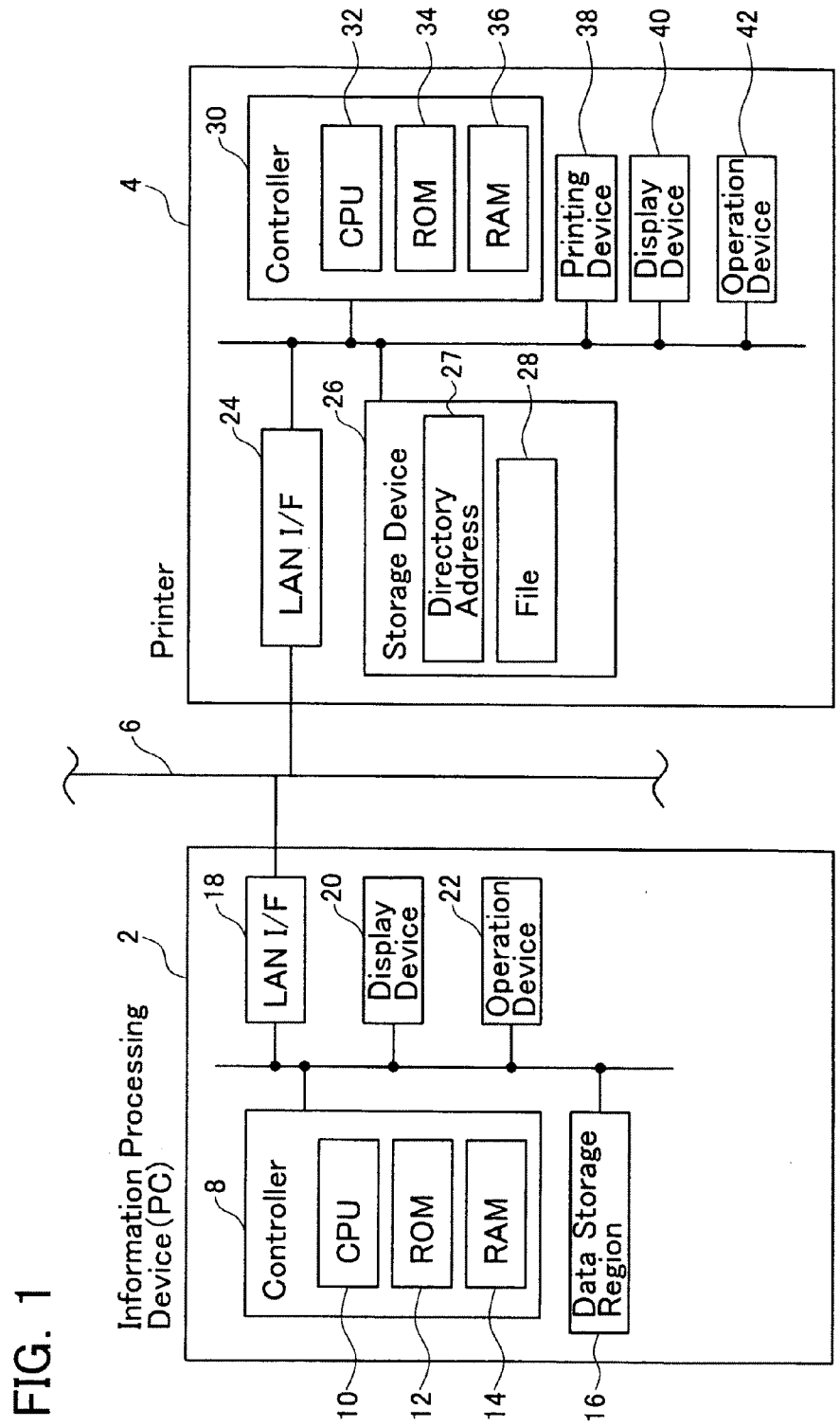
FIG. 1 shows an outline configuration of an information processing device (PC) and a printer.

FIG. 1 shows an outline configuration of an information processing device (PC) 2 and a printer 4 of the present embodiment. The information processing device 2 and the printer 4 are communicably connected to a LAN network 6. Although this is not shown, the LAN network 6 is connected with a plurality of machines such as information processing devices, printers, etc. The information processing device 2 and the printer 4 are capable of communicating utilizing a WebDAV protocol. A controller 8 of the information processing device 2 comprises a printer driver program. As a result, in the present embodiment, a configuration is possible in which, after the printer driver program has created a job creating command and the print data and sent this to the printer 4, a job managing command and the address data are communicated utilizing the WebDAV protocol. In the present embodiment, the information processing device 2 and the printer 4 are connected to the LAN network (LAN circuit) 6. However, the information processing device 2 and the printer 4 may be connected by means of a USB cable or the like and not via a network.

(Configuration of Information Processing Device)

The information processing device 2 comprises the controller 8, a data storage region 16, a LAN interface 18, a display device 20, and an operation device 22. The controller 8 consists of a CPU 10, a ROM 12, and a RAM 14. Various programs are stored in the ROM 12 and the RAM 14, such as for example an OS program, a document creating program, a printer driver program, a communication protocol, etc. The information processing device 2 operates by means of the CPU 10 executing these programs. Further, the information processing device 2 is capable of communicating with the printer 4 via the LAN interface 18.

Data such as document data, image data, etc. is stored in the data storage region 16. The display device 20 is capable of displaying information, such as the data stored in the data storage region 16, a user interface screen of a program executed by the controller 8, etc. The operation device 22 comprises a mouse and a keyboard. The user can input information such as a print order etc. to the controller 8 by operating the operation device 22.

In the present embodiment, printing is ordered by means of the interface screen created by the printer driver program stored in the information processing device 2. When printing is ordered, the controller 8 creates print data (bit-mapped data) of the data for which printing has been ordered, and sends a job creating command. The process of creating the print data and the process of sending the job creating command will be described in detail later.

(Configuration of Printer)

The printer 4 comprises a controller 30, a LAN interface 24, a storage device 26, a printing device 38, a display device 40, and an operation device 42. The controller 30 consists of a CPU 32, a ROM 34, and a RAM 36. Various programs are stored in the ROM 34 and the RAM 36, such as for example a communication program, a printing program, etc. The printer 4 operates by means of the CPU 32 executing these programs. Further, the printer 4 is capable of communicating with the information processing device 2 via the LAN interface 24. The contents of a process executed by the controller 30 of the printer 4 when the job creating command has been sent from the information processing device 2 will be described with a flow chart (to be described). The display device 40 is capable of displaying information such as the data stored by the storage device 26, a user interface screen of the program executed by the controller 30, etc. The operation device 42 comprises operation buttons, etc. The user can input information such as the print command, etc. to the printer 4 by operating the operation device 42.

(Hierarchical Structure of Directory and File)

The following are stored in the storage device 26: a directory address 27 and a file 28 that is created by the controller 30 based on data received from the information processing device 2. The directory address 27 is address data that forms a superior address of the file address. The following are present in the directory address 27: a superior directory address, a job directory address, and a document directory address. The job directory address has the superior directory address as its superior address, and the document directory address has the job directory address as its superior address. That is, the directory addresses are in relationships that have a hierarchical structure. In the file 28, a file address and print data received from the information processing device 2 are associated. The file address has the directory address 27 as its superior address. That is, the directory address 27 and the file address are in a relationship that has a hierarchical structure.

Figure 2:
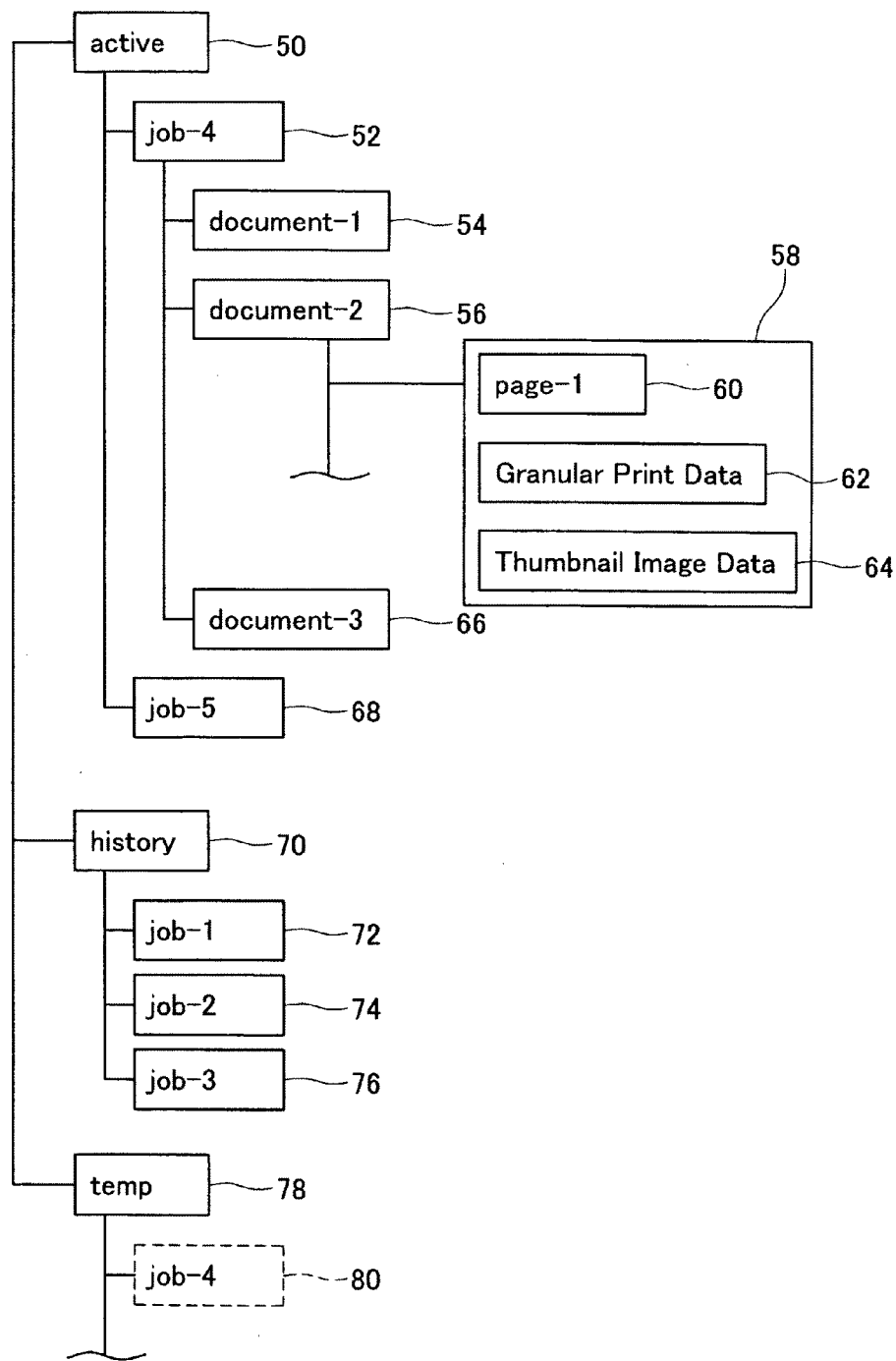
FIG. 2 shows the structural relationship between directories and files stored in a storage device.

FIG. 2 is an example showing the hierarchical structure of the directory address 27 and the file 28 that are being stored in the storage device 26. The following are present as superior directory addresses that are being stored in the storage device 26 of the printer 4: a temp directory 78, an active directory 50, and a history directory 70. These directory addresses are the most superior hierarchical unit of the directory address 27, and the job directory is a subordinate hierarchical unit thereof. The job directory is created each time a job creating command is received. One address from either the temp directory 78, the active directory 50, or the history directory 70 is designated as the superior address of the job directory address.

The document directory is a subordinate hierarchical unit of the job directory. The document directory is a unit that is composed of each predetermined plurality of pages. For example, one document directory is composed of the print data of five pages. A plurality of document directories may be included in one job directory. The document directory address designates one of the job directory addresses as its superior address.

The file is a subordinate hierarchical unit of the document directory. In the file, one granular print data and the file address are associated. For example, in the file 58 included in the document directory 56 of FIG. 2, granular print data 62 and the file address ("page-1") 60 are associated. Moreover, in the present embodiment, one granular print data corresponds to one page of print data. Further, in the present embodiment, the contents of the granular print data 62 and of thumbnail image data 64 (to be described) are included in the file 58. The file address designates one of the document directory addresses as its superior address. Each of the files 58 may merely be an association of respective granular print data and the file address created therefor, such that the association is recognized as a file when the information processing device makes access to the storage device 26.

When the printer 4 receives the job creating command, the controller 30 (see FIG. 1) first follows the job creating command to create a job directory address in which the temp directory address is the superior address. The printer 4 stores the created job directory address in the storage device 26. The job directory is thus created. That is, a hierarchical relationship of the temp directory 78 and the job directory is organized. FIG. 2 shows the hierarchical relationship of the temp directory 78 and the job directory 80. Moreover, although this is not shown in FIG. 2, the printer 4 creates a document directory that is a subordinate directory of the job directory 80, and creates a plurality of files that are subordinate files of the document directory. The method of creating the document directory and the files will be described below in detail.

First, the printer 4 creates the document directory address in which the job directory address is the superior address. In the case of the example described above, the document directory address is created in which a job directory address (job-4) of the job directory 80 is the superior address. The printer 4 stores the created document directory address in the storage device 26. The document directory is thus created. As described above, in the present embodiment, one document directory is formed for the print data of five pages. It can also be termed that the document directory is capable of including files for five granular print data. Consequently, in the case of print data for ten pages, two document directory addresses are created and stored in the storage device 26. As a result, two document directories are created.

Further, for each of the pages of the five pages that constitute the document directory, the printer 4 creates a file address in which the document directory is the superior address. For example, for the print data (granular print data) of the first page, a file address called "page-1" is created. Similarly, for the print data (granular print data) of the fifth page, a file address called "page-5" is created. The printer 4 associates the created file addresses and the corresponding granular print data (the print data for one page) and stores this in the storage device 26. The files are thus created. As described above, one document directory is formed for the print data of five pages. As a result, five files are created for one document directory.

The printing device 38 (see FIG. 1) does not print files which have the temp directory address as the superior address. As a result, the user can execute desired management (deleting, moving, copying, etc.) of the job directory 80 that is being stored in the temp directory 78 and for the subordinate files thereof. The contents of this management will be described in detail later. Moreover, in the case where the job creating command has been sent to the printer 4, the superior directory address (i.e. the temp directory address) that is utilized may be set in advance by the printer driver program of the information processing device 2. Alternatively, the use of the temp directory address may be set at the printer 4 side.

The printing device 38 prints a file which has the active directory address as the superior address. In the example in FIG. 2, the granular print data 62 of the file 58 is printed. Files other than those which have the active directory address as the superior address (for example, a subordinate file of the document directory 54 or a subordinate file of the document directory 66) are not shown in FIG. 2, but these files are also printed in sequence. In the case where the user wants to execute printing of the job directory 80 included in the temp directory 78, the user moves or copies the job directory 80 to the active directory 50. The subordinate files of the job directory 80 are thus printed in sequence. Moreover, in the case where a plurality of job directories 52 and 68 are stored in the active directory 50, the printing device 38 executes printing in sequence starting from the job directory that was stored first.

When printing of all the files included in the job directory has been completed, the printer 4 moves this job directory to the history directory 70. For example, in the example in FIG. 2, three job directories 72, 74, and 76 are being stored in the history directory 70.

(Object Displayed by Information Processing Device)

Figure 3:
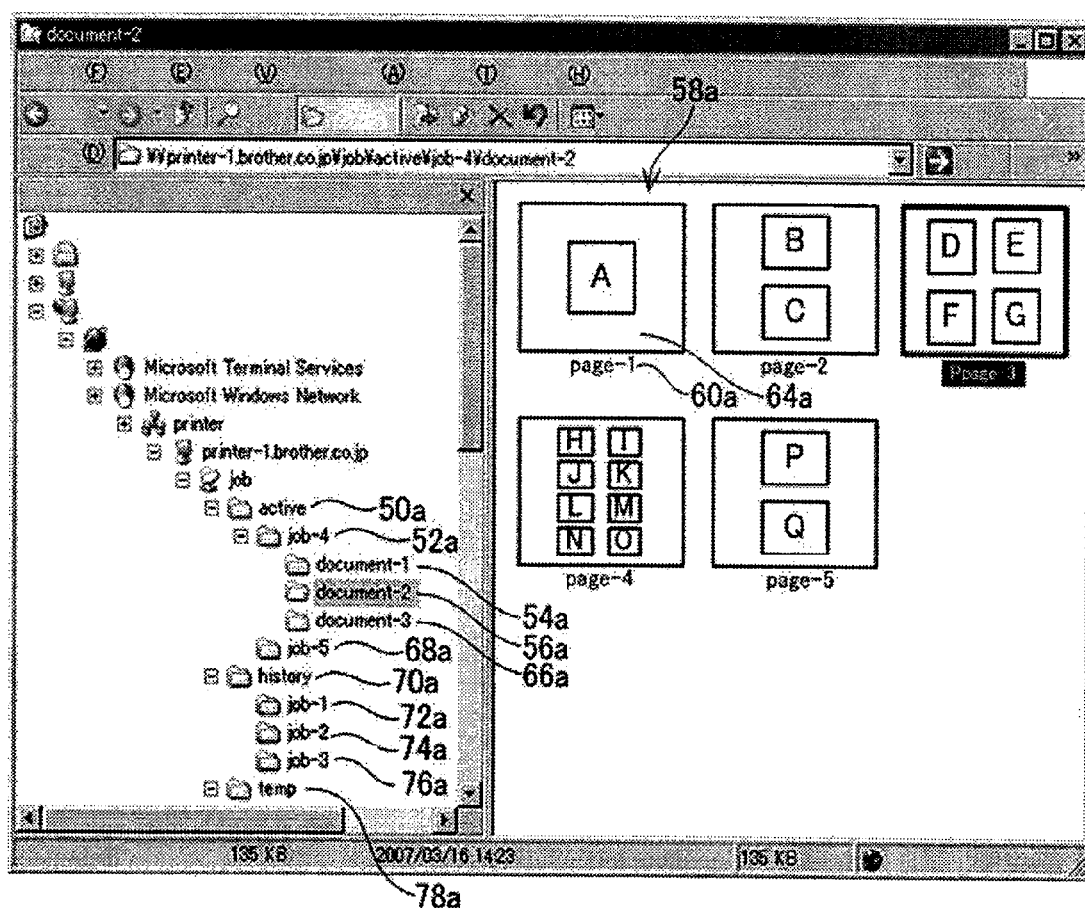
FIG. 3 shows an example of directory objects displayed by a display device of the information processing device.

The address data created by the controller 30 (the superior directory address, the job directory address, the document directory address, and the file address) can be sent to the information processing device 2 utilizing the WebDAV protocol. The information processing device 2 can thus display objects corresponding to the address data in the display device 20 showing the relationship between a directory object and a file object. FIG. 3 shows an example of objects displayed by the display device 20 of the information processing device 2. Further, FIG. 3 is based on Explorer (file management software) included in Microsoft Windows (registered trademark). In the example in FIG. 3, directory objects 50a, 70a, and 78a are displayed that correspond to the superior directories 50, 70, and 78. Further, directory objects 52a, 68a, 72a, 74a, and 76a are displayed that correspond to the job directories 52, 68, 72, 74, and 76. Further, directory objects 54a, 56a, and 66a are displayed that correspond to the document directories 54, 56, and 66. Furthermore, a file object 58a that corresponds to the file 58 is displayed in a display region that denotes the interior of the directory object 56a. Another four file objects (not numbered) are displayed in this display region. The user can add various operations to these objects by operating the operation device 22 (see FIG. 1) of the information processing device 2. The information processing device 2 can thus send communication commands corresponding to these operations to the printer 4 using a file sharing protocol. The printer 4 executes processes that correspond to the communication commands from the information processing device 2. The contents of these processes will be described in detail below.

(Processes Executed by Information Processing Device)

Figure 4:
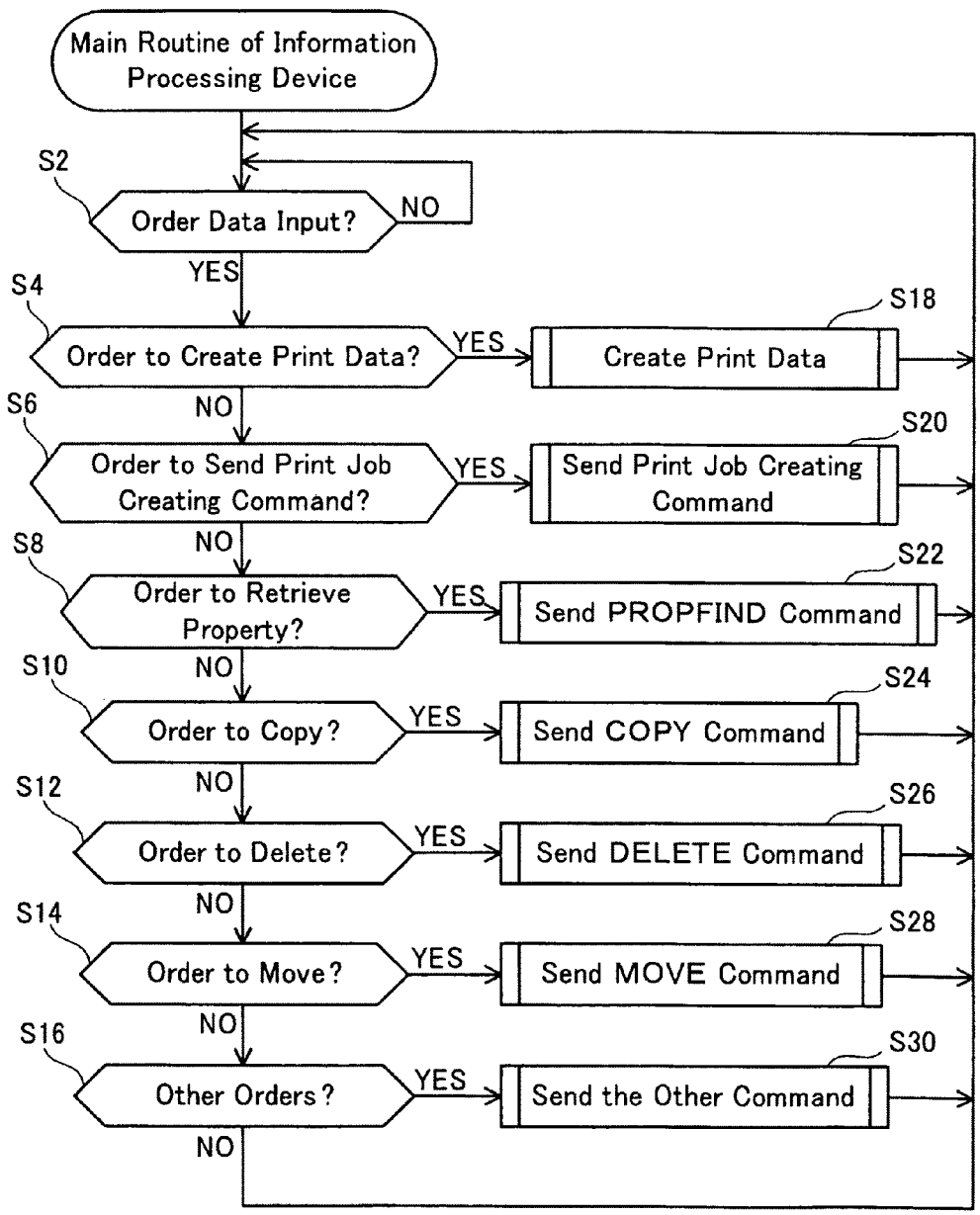
FIG. 4 is a flow chart showing an outline of processes of a processing device of the information processing device.

FIG. 4 is a flow chart showing an outline of processes of the controller 8 of the information processing device 2. In step S2, it is determined whether order data has been input to the controller 8. The data is input by operating the operation device 22. The order data is orders relating to the execution of printing that are input by means of the operation device 22, such as an order to send a job creating command, an order to retrieve property, etc. When the order data has been input (YES in step S2), it is determined which type of order has been input, as shown from step S4 onward, and the process corresponding to that order is executed.

Figure 6:
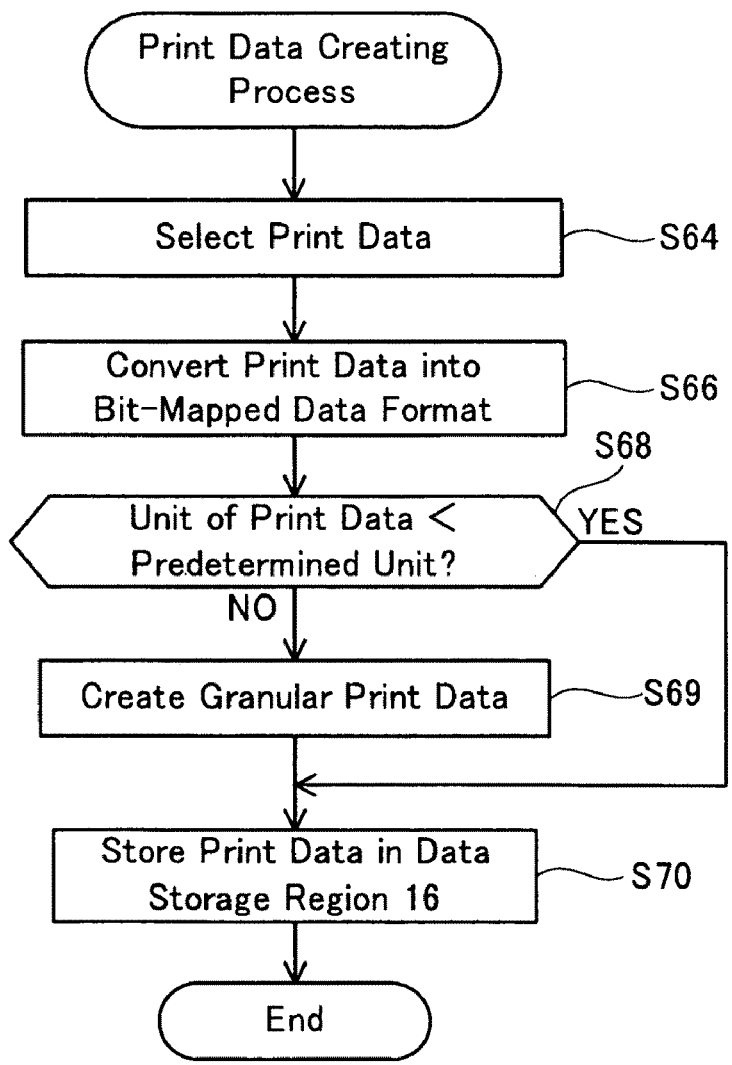
FIG. 6 is a flow chart showing an outline of a print data creating process.

In step S4, it is determined whether the order data is an order to create print data. As described above, the order to create print data is input based on the print order executed using the interface screen created by the printer driver program stored in the information processing device 2. In the case where the order data is the order to create print data (YES in step S4), the controller 8 executes a print data creating process (step S18). Specifically, a sub routine shown in FIG. 6 is executed in the print data creating process. FIG. 6 is a flow chart showing an outline of the print data creating process.

In step S64, print data is selected. Specifically, print data whose printing has been ordered by the user is selected. The print data selected in this step is data that is being stored in the data storage region 16 (see FIG. 1). In step S66, the selected print data is converted into bit-mapped data. At this juncture, it is determined whether the print data is smaller than a predetermined unit (one page) (step S68). If the print data is greater than the predetermined unit (NO in step S68), the print data is divided into a plurality of predetermined units of granular print data (step S69). If the print data is smaller than the predetermined unit (YES in step S68), it is not necessary to divide the print data into a plurality of granular print data. The created print data is stored in the data storage region 16 (step S70). The process of step S18 of FIG. 4 is executed by the series of processes from step S64 to step S70.

Figure 7:
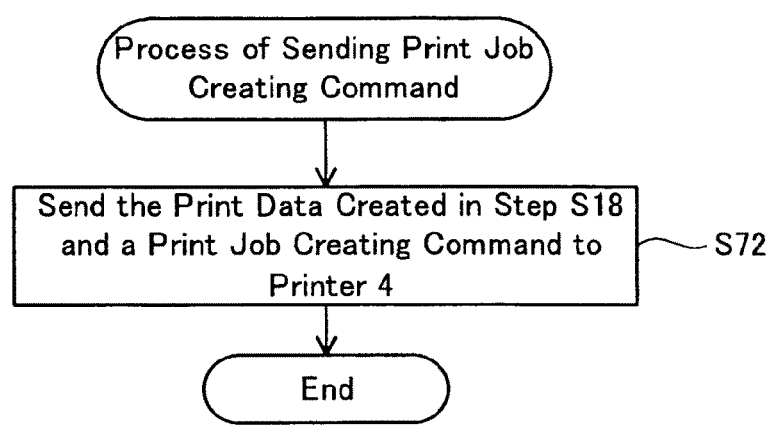
FIG. 7 is a flow chart showing an outline of a process of sending a job creating command.

In step S6 of FIG. 4, it is determined whether the order data is an order to send a job creating command to the printer 4. Like the order to create print data, the order to send the job creating command is input based on the print order executed using the interface screen created by the printer driver program stored in the information processing device 2. In the case where the order data is the order to send the job creating command (YES in step S6), a process of sending a job creating command is executed (step S20). Specifically, a sub routine shown in FIG. 7 is executed in the process of sending the job creating command. FIG. 7 is a flow chart showing an outline of the process of sending the job creating command. In step S72, the print data that was created in step S18 of FIG. 4 and the job creating command are sent to the printer 4. The process of step S20 of FIG. 4 is thereby executed.

When the job creating command is sent to the printer 4, the printer 4 creates and stores address data such as the job directory address, etc. based on the job creating command and the print data that were received. At this juncture, the address data that is being stored in the storage device 26 of the printer 4 can be sent to the information processing device 2 by operating the information processing device 2. It is thereby possible with the information processing device 2, as shown for example in FIG. 3, to display the job or the print data that was ordered to be printed by the printer 4 as a directory object or a file object in the display device 20. The processes described below are executed in the case where an operation has been executed at the information processing device 2 side upon the directory object or a file object that is being displayed in the display device 20.

Figure 8:
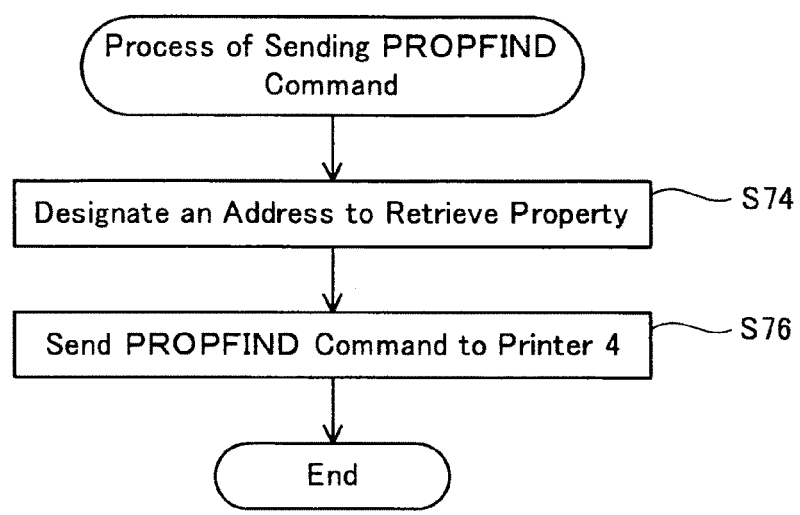
FIG. 8 is a flow chart showing an outline of a process of sending a PROPFIND command.

In step S8 of FIG. 4, it is determined whether an order to retrieve property of the object being displayed in the display device 20 has been input to the controller 8. The property of the object is information (address data, creation date, creator, etc.) relating to the object that is present at a subordinate level of that object. For example, as shown in the example in FIG. 3, in the case where the history directory object 70a is being displayed, one may want to know a property of the history directory 70 (i.e. information of the job directory that is a subordinate level of the history directory 70). In this type of case, the user can operate the operation device 22 to input the order to retrieve property. For example, by double clicking on the history directory object 70a of FIG. 3, the user can input the order to retrieve property so as to retrieve information relating to the job directory that is the subordinate level of the history directory 70. In the case where the order to retrieve property has been input (YES in step S8), the controller 8 executes a process of sending a PROPFIND command (step S22). Specifically, a sub routine shown in FIG. 8 is executed in step S22. FIG. 8 is a flow chart showing an outline of the process of sending the PROPFIND command.

In step S74, an address to retrieve property is designated. The address to retrieve property is an address corresponding to the object that was selected in the aforementioned double click operation. In the case of the above example, the directory address "history" is designated. When the address is designated, the controller 8 creates the PROPFIND command, and sends the address designated in step S74 and the PROPFIND command to the printer 4 (step S76). In the case of the above example (the case where the history directory object 70a was double clicked), the controller 8 sends the history directory address and the PROPFIND command to the printer 4. The process of step S22 of FIG. 4 is executed by the series of processes from step S74 to step S76.

In step S10 of FIG. 4, it is determined whether an order to copy the object has been input to the controller 8. For example, in the case where a print process is to be executed again that is the same as a job whose order has been completed by the printer 4, the user can operate the operation device 22 to input an order to copy the job object being displayed by the display device 20. For example, in the case where the reprinting of "job-1" is desired that corresponds to the job directory object 72a (see FIG. 3) whose printing has been completed, the user can copy the job directory object 72a being displayed by the display device 20 into the active directory object 50a.

Figure 9:
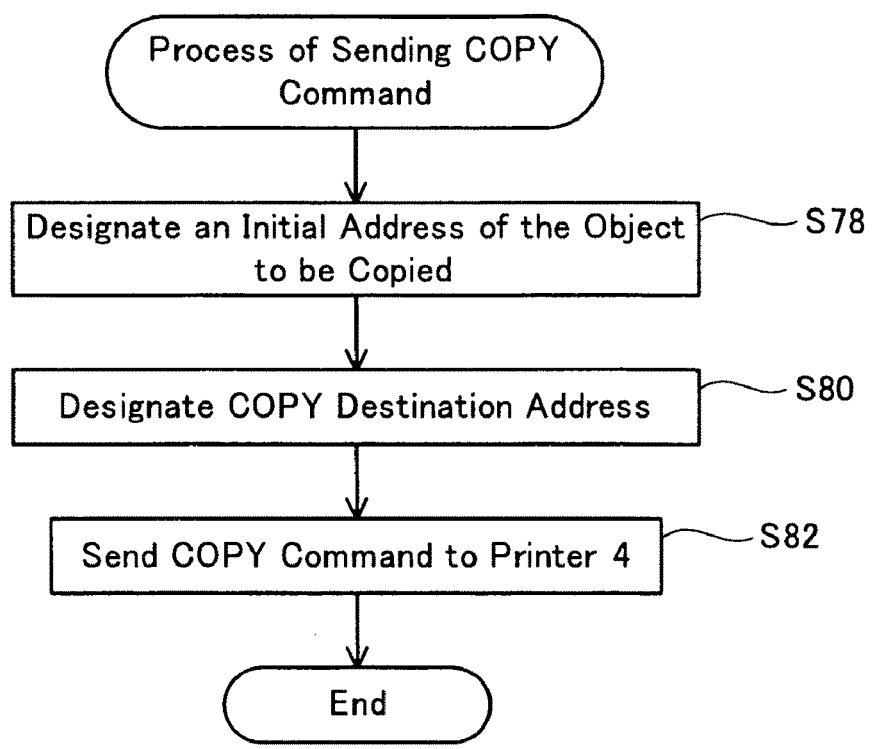
FIG. 9 is a flow chart showing an outline of a process of sending a COPY command.

Further, in the case where printing is desired of a job that is a subordinate of the temp directory 78, the user can copy the job directory object corresponding to that job into the active directory object 50a. As described above, since the printing device 38 executes printing in sequence of files which have the active directory address as the superior address, printing is executed for the job that has been copied into the active directory address. In the case where the order to copy has been input (YES in step S10), the controller 8 executes a process of sending a COPY command (step S24). Specifically, a sub routine shown in FIG. 9 is executed in step S24. FIG. 9 is a flow chart showing an outline of the process of sending the COPY command.

In step S78, the controller 8 designates an initial address of the object to be copied. The initial address of the object to be copied is an address corresponding to the object that was selected in the copy operation. For example, in the case where the job directory object 72a shown in FIG. 3 has been copied from the history directory object 70a to the active directory object 50a, the controller 8 designates the initial address of the object to be copied as "history/job-1". Next, in step S80, a copy destination address is designated. The copy destination address is the directory address of a destination of the object copied in the copy operation. In the case of the above example, the controller 8 designates "active" as the copy destination address. When the address is designated, the controller 8 creates the COPY command, and sends the designated initial address of the object to be copied, the copy destination address, and the COPY command to the printer 4 (step S82). The process of step S24 of FIG. 4 is executed by the series of processes from step S78 to step S82.

Figure 10:
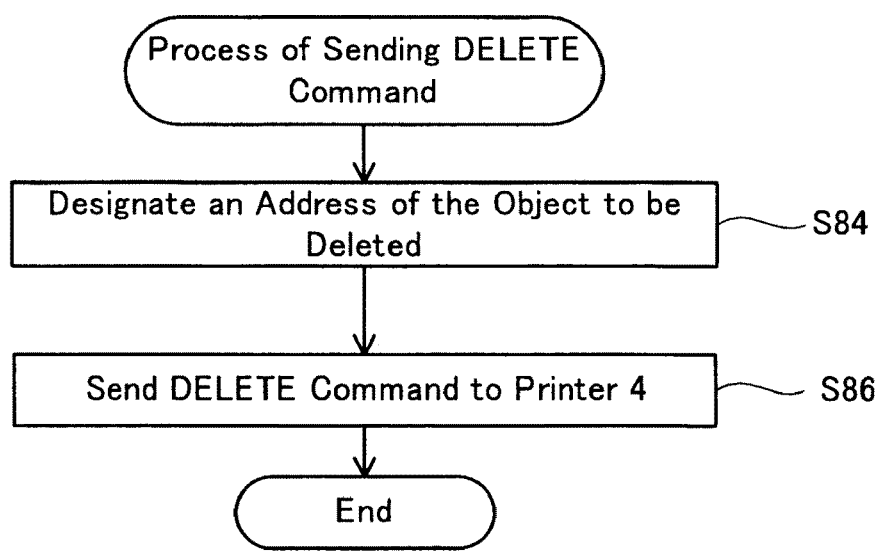
FIG. 10 is a flow chart showing an outline of a process of sending a DELETE command.

In step S12 of FIG. 4, it is determined whether an order to delete the object has been input to the controller 8. For example, one may want to cancel a job whose order has been completed by the printer 4, or may want to cancel the printing of a part of the print data included in a job. In this type of case, the user can operate the operation device 22 to input an order to delete the object whose cancellation is desired. For example, in the case where the cancellation of printing is desired of all the print data included in the document directory 66 corresponding to the document directory object 66a shown in FIG. 3, the user can input an order to delete the document directory object 66a being displayed by the display device 20. When the order to delete has been input (YES in step S12), the controller 8 executes a process of sending a DELETE command (step S26). Specifically, a sub routine shown in FIG. 10 is executed in the process of sending the DELETE command. FIG. 10 is a flow chart showing an outline of the process of sending the DELETE command.

In step S84, the controller 8 designates an address of the object to be deleted. This address is an address corresponding to the object that was selected in the delete operation. For example, in the case where the document directory object 66a of FIG. 3 has been deleted, the controller 8 designates "active/job-4/document-3". When the address is designated, the controller 8 creates the DELETE command, and sends the designated address and the DELETE command (step S86). The process of step S26 of FIG. 4 is executed by the series of processes from step S84 to step S86.

Figure 11:
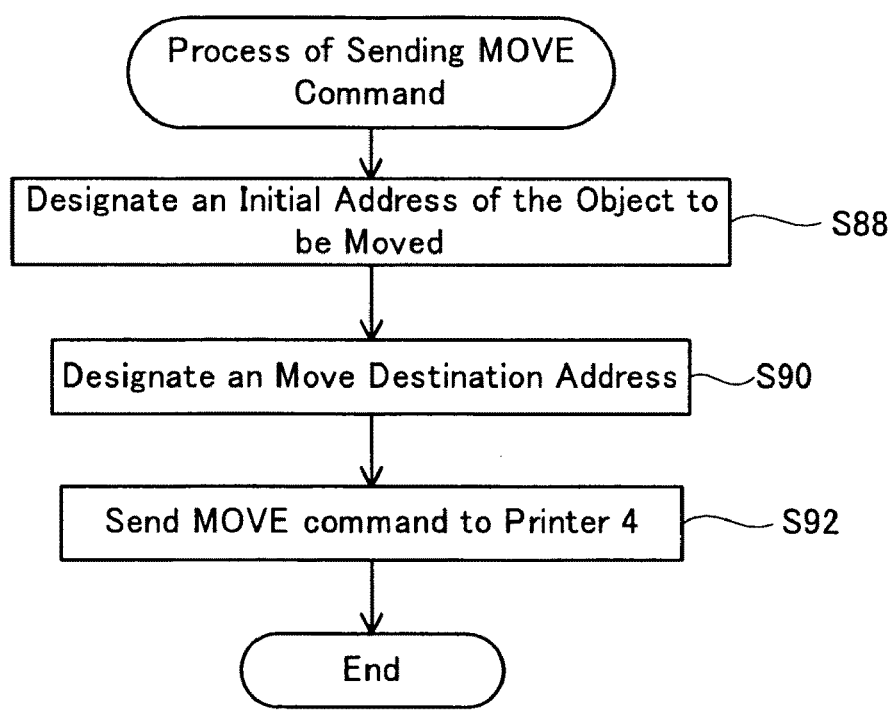
FIG. 11 is a flow chart showing an outline of a process of sending a MOVE command.

In step S14 of FIG. 4, it is determined whether an order to move the object has been input to the controller 8. For example, in the case where it is desired to start printing at a job that has the temp directory address as the superior address, the user can input an order to move (or may equally well input an order to copy) the desired job object into the active directory object 50a. When the order to move is input (YES in step S14), the controller 8 executes a process of sending a MOVE command (step S28). Specifically, a sub routine shown in FIG. 11 is executed in step S28. FIG. 11 is a flow chart showing an outline of the process of sending the MOVE command.

In step S88, the controller 8 designates an initial address of the object to be moved. The initial address of the object to be moved is an address corresponding to the object that was selected in the move operation. Next, in step S90, a move destination address is designated. The move destination address is the directory address of a destination of the object moved in the move operation. For example, in the case where the order has been input to print the "job-4" of the job 80 that is a subordinate of the temp directory 78 shown in FIG. 2, the controller 8 designates "temp/job-4" as the initial address of the object to be moved, and designates "active" as the move destination address. When the address is designated, the controller 8 creates the MOVE command, and sends the designated initial address of the object to be moved, the move destination address, and the MOVE command (step S92). The process of step S28 of FIG. 4 is executed by the series of processes from step S88 to step S92.

In step S16 of FIG. 4, it is determined whether another order has been input to the controller 8. In the case of YES in step S16, the controller 8 creates a command corresponding to that order, and executes a process of sending that command to the printer 4 (step S30). A command created by the printer driver program may be sent to the printer 4 in this step, such as for example a command for setting a print setting, a command for retrieving printer information such as for example the amount of ink remaining in the printer, etc., or another command may be sent that is created by the WebDAV protocol.

Figure 5:
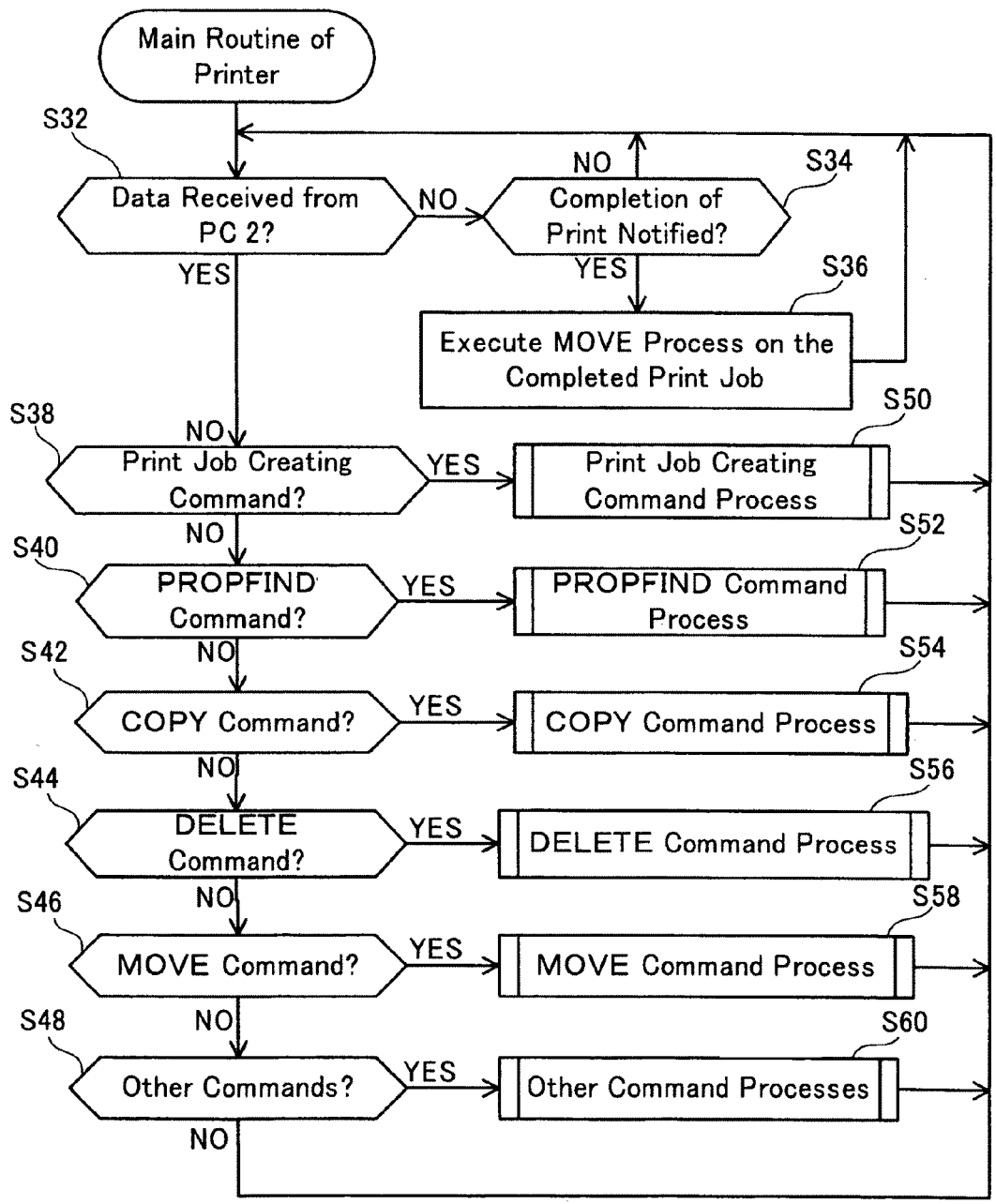
FIG. 5 is a flow chart showing an outline of a process of a controller of the printer.

FIG. 5 is a flow chart showing an outline of a process of the controller 30 of the printer 4. The process shown in FIG. 5 corresponds to the commands sent by the processes of the information processing device 2 shown in FIG. 4. In step S32, it is determined whether data has been received that was sent from the information processing device (PC) 2 via the LAN interface 24. If the data has been received (YES in step S32), it is determined that the process from step S38 onward is to be shown, and command processes corresponding to each of the commands are executed. In the case where the data from the information processing device 2 has not been received (NO in step S32), the controller 30 determines whether it has been notified by the printing device 38 that printing has been completed (step S34). In this step, it is determined whether notification has been given from the printing device 38 that printing of a job as a unit has been completed. The completion of printing is not notified until the printing of all the print data has been completed, this including the job that is currently being printed by the printing device 38 (NO in step S34). When printing has been completed of all the print data including the job, the printing device 38 notifies the controller 30 that printing has been completed (YES in step S34). When the completion of printing has been notified, the controller 30 executes a MOVE process to move the job whose printing has been completed to the history directory 70 (step S36). The MOVE process will be described in detail later.

Figure 12:
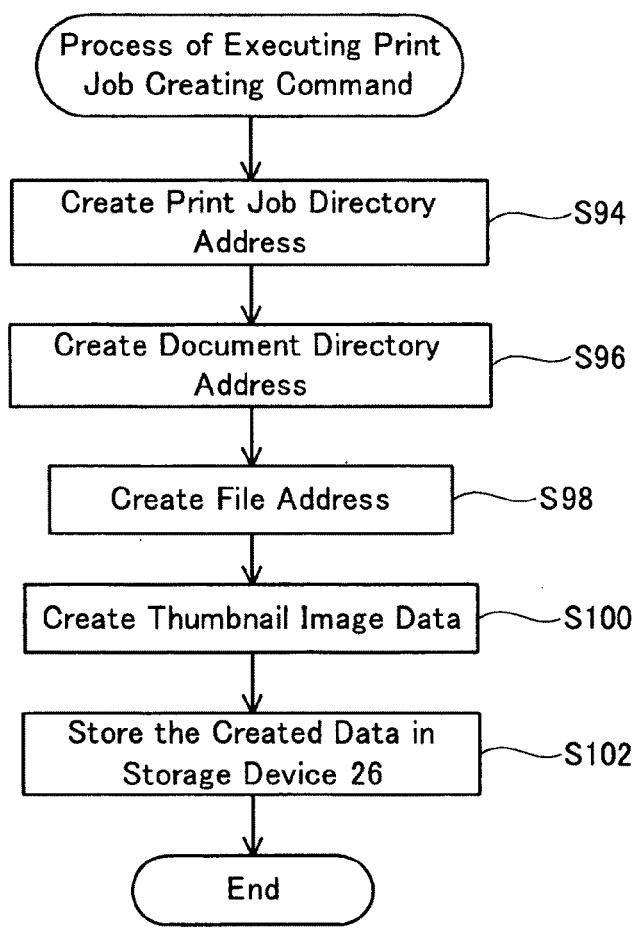
FIG. 12 is a flow chart showing an outline of a process of executing the job creating command.

In step S38, it is determined whether the job creating command has been received. In the case where the job creating command has been received (YES in step S38), the controller 30 executes a job creating command process (step S50). Specifically, a sub routine shown in FIG. 12 is executed in step S50. FIG. 12 is a flow chart showing an outline of the process of executing the job creating command. When the job creating command has been received, the controller 30 creates a job directory address that corresponds to the job creating command (step S94). In this step, a job directory address is created in which a temp directory address is the superior address. The job directory address has the temp directory address as the superior address, and is not particularly restricted as long as it is an address discernable from other job directories. For example, the job directory address may be created based on the date that the job creating command was received, on the order in which the command was received at the printer 4 side, etc., or may be created utilizing a property value such as a URL, URI (Uniform Resource Identifier), etc.

Next, the controller 30 creates a document directory address (step S96). The document directory address is created with the job directory address created in step S94 as the superior address. The document directory of the present embodiment is a unit formed every five pages. Further, the print data that has been received with the job creating command is divided into granular print data in which one page is a predetermined unit. As a result, in this step, the document directory address is created according to the number of print data. For example, in the case where ten pages of print data are present (ten items of granular print data), two job directory addresses are created (for example, "document-1" and "document-2"). Similar to the job directory address, the document directory address is not particularly restricted as long as it is discernable from other document directories included in the same job directory.

In step S98, a file address corresponding to the print data is created. The file address is created with the job directory address created in step S94 and the document directory address created in step S96 as the superior addresses. Further, a file address is created in this step for each print data (granular print data) that was received. For example, in the case where there is print data for ten pages (ten items of granular print data), ten file addresses are created in accordance. In this case, two document directory addresses should be created, five file addresses having one of the document directory addresses as the superior address, and five file addresses having the other of the document directory addresses as the superior address.

Next, in step S100, thumbnail image data is created of the granular print data (i.e. one page of print data) whose file address was created in step S98. The thumbnail image is a low resolution small size image that has been converted from data stored in the granular print data. A thumbnail image with png, jpg, etc. format may be created in this step.

In step S102, the address data and the thumbnail image data created in step S94 to step S100 is stored in the storage device 26. That is, the controller 30 stores the job directory address and the document directory address in the storage device 26. The job directory and the document directory are thus created. Further, the controller 30 associates the granular print data, the file address created in step S98, and the thumbnail image data created in step S100, and stores them in the storage device 26. The file is thus created (see FIG. 2). In the case of the above example, (the case where there is ten pages of print data), ten files are created. The thumbnail image data included in the file is sent with the file address to the information processing device 2 in a PROPFIND command process (to be described). The file object 58a shown in FIG. 3 can be displayed as a thumbnail at the information processing device 2 side from the received file address and thumbnail image data. The process of step S50 of FIG. 5 is executed by the series of processes from step S94 to step S102.

Figure 13:
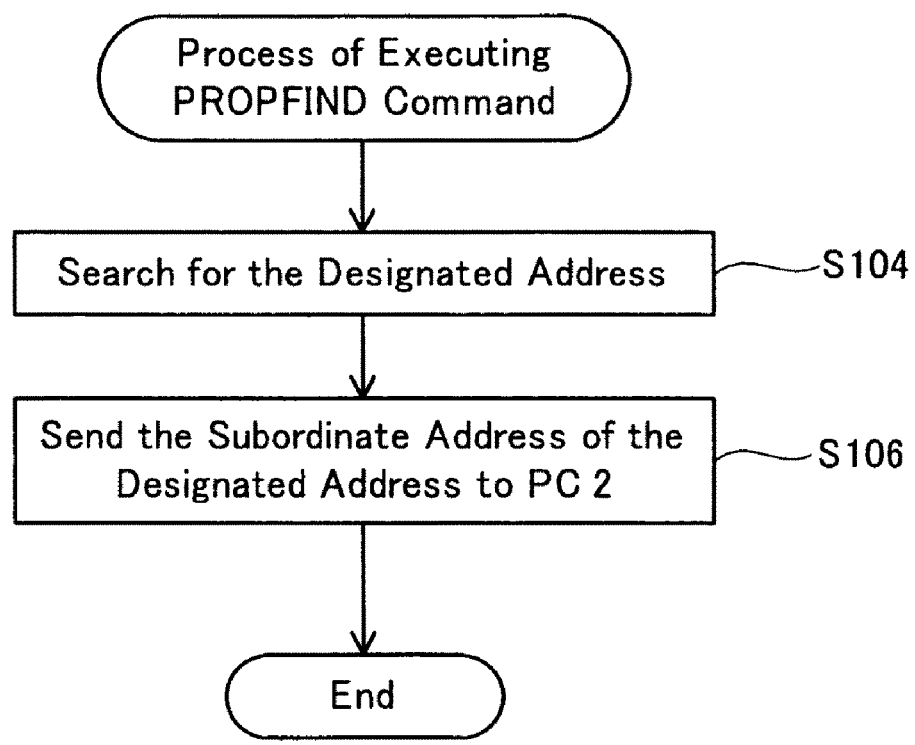
FIG. 13 is a flow chart showing an outline of a process of executing the PROPFIND command.

In step S40 of FIG. 5, it is determined whether a PROPFIND command has been received. In the case where the PROPFIND command has been received (YES in step S40), the controller 30 executes the PROPFIND command process (step S52). Specifically, a sub routine shown in FIG. 13 is executed in step S52. FIG. 13 is a flow chart showing an outline of the process of executing the PROPFIND command. When the PROPFIND command has been received, the controller 30 searches for an address designated in the PROPFIND command (step S104). Next, a subordinate address of the designated address is referred to, and address data thereof is sent to the information processing device 2 (step S106). At this juncture, if the sent address data is a file address, the file address and the thumbnail image data are sent. That is, if a superior directory address (for example, "history") is designated in the PROPFIND command at this step, job directory addresses that are subordinate directories thereof (for example, "job-1", "job-2" and "job-3") are sent to the information processing device 2. Further, if a job directory address is designated (for example, "job-4"), document job directory addresses that are subordinate directories thereof (for example, "document-1", "document-2" and "document-3") are sent to the information processing device 2. Further, if a document directory address is designated (for example, "document-2"), file addresses that are subordinate directories thereof (for example, "page-1", etc.) and the thumbnail image data corresponding to that file address (for example, the thumbnail image data 64 of FIG. 2) are sent to the information processing device 2. Utilizing the received address data, the superior directory object, the job directory object, the document directory object, and the file object can be displayed in the information processing device as objects that have a hierarchical structural relationship. Furthermore, the file object can be displayed as a thumbnail image.

The process of step S52 of FIG. 5 is executed by the series of processes from step S104 to step S106. Moreover, in the case where the address designated in the PROPFIND command has no subordinate directory, an error message may be sent to the information processing device to provide notification thereof.

Figure 14:
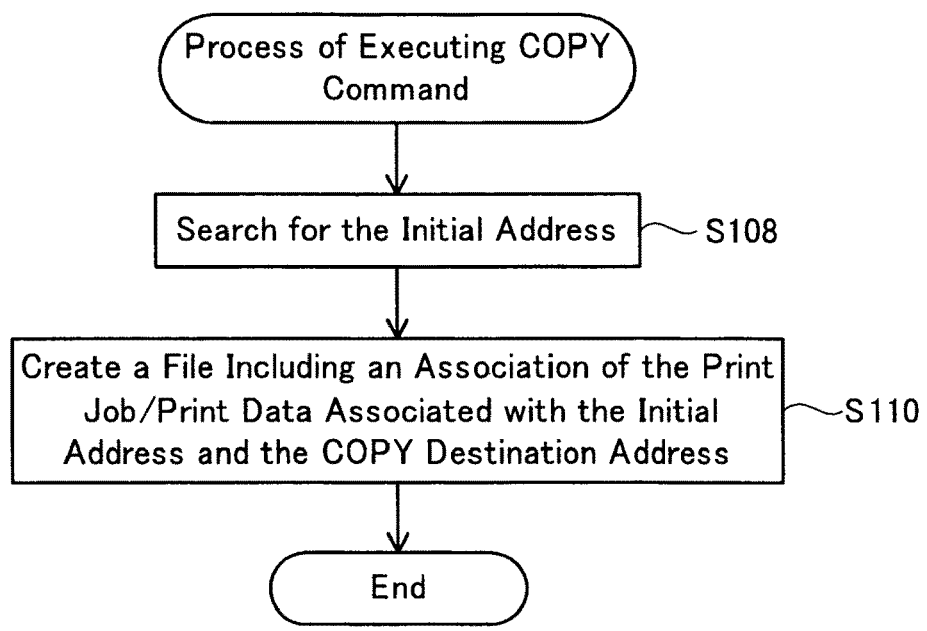
FIG. 14 is a flow chart showing an outline of a process of executing the COPY command.

In step S42 of FIG. 5, it is determined whether a COPY command has been received. In the case where the COPY command has been received (YES in step S42), the controller 30 executes a COPY command process (step S54). Specifically, a sub routine shown in FIG. 14 is executed in step S54. FIG. 14 is a flow chart showing an outline of the process of executing the COPY command. When the COPY command has been received, the controller 30 searches for an initial address designated in the COPY command (step S108). Next, a file is created from the print data associated with the designated copy initial address, the designated copy destination address being the superior address in this file (step S110). For example, in the case where the job directory address has been designated as the copy initial address, a superior directory address ("active", "history", or "temp", etc.) is typically designated as the copy destination address. For example, in the case where "history/job-1" is designated as the copy initial address, and "active" is designated as the copy destination address (see FIG. 2), the controller 30 first creates a job directory address "active/job-1" and stores this in the storage device 26. Next, the controller 30 creates a document directory address "active/job-1/document-1" for a document directory (for example, "document-1") that is subordinate to the "history/job-1", and stores this in the storage device 26. Next, the controller 30 creates a file address "active/job-1/document-1/page-1" for a file (for example, "page-1") that is subordinate to the "history/job-1/document-1". The controller 30 associates granular print data and thumbnail image data (these are being stored in the storage device 26) that are included in "history/job-1/document-1/page-1" to the file address (active/job-1/document-1/page-1) that was created, and stores this in the storage device 26. The job directory, document directory, and file that are subordinate to the active directory 50 are thus created.

Further, in the case for example where the file address has been designated as the copy initial address, the document directory address is designated as the copy destination address. In this case, the controller 30 creates anew a file address in which the document directory address that is the copy destination is the superior address. This file address and the granular print data associated with the file address of the copy initial address are associated and stored in the storage device 26. Further, in the case for example where the document directory address has been designated as the copy initial address, the job directory address is designated as the copy destination address. In this case, the controller 30 creates anew a document directory address in which the job directory address of the copy destination is the superior address, and creates anew a file address in which the document directory address is the superior address. This file address, the document directory address having the copy initial address as the superior address, and the granular print data associated with the file address are associated and stored in the storage device 26. Moreover, if a newly created file has the active directory address as the superior address, this file is printed by the printing device 38. The process of step S54 of FIG. 5 is executed by the series of processes from step S108 to step S110.

Figure 15:
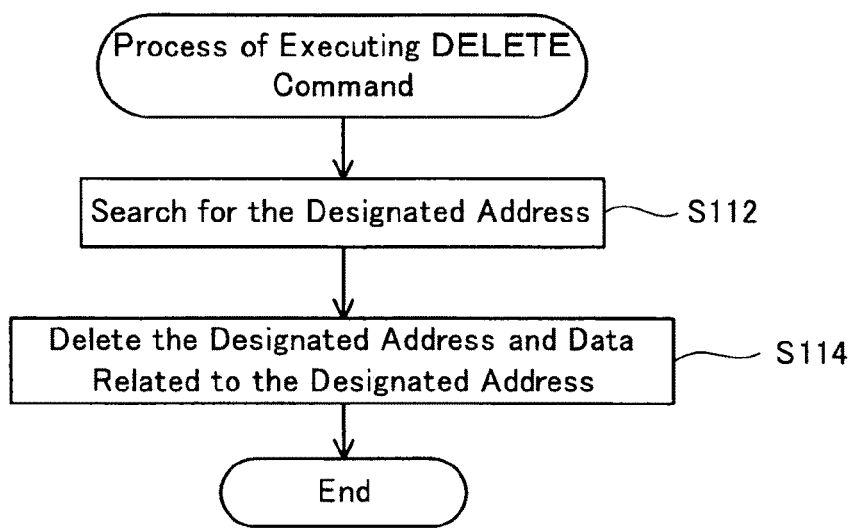
FIG. 15 is a flow chart showing an outline of a process of executing the DELETE command.

In step S44 of FIG. 5, it is determined whether a DELETE command has been received. In the case where the DELETE command has been received (YES in step S44), the controller 30 executes a DELETE command process (step S56). Specifically, a sub routine shown in FIG. 15 is executed in step S56. FIG. 15 is a flow chart showing an outline of the process of executing the DELETE command. When the DELETE command has been received, the controller 30 searches for an address designated in the DELETE command (step S112). Next, in step S114, the controller 30 deletes the designated address and the data associated with this address from the storage device 26. For example, if the designated address is the job directory address, all of the directory addresses and files included in this address are deleted from the storage device 26. That is, the following are deleted from the storage device 26: the job directory address, document directory addresses in which the job directory address is the superior address, and files in which the document directory addresses is the superior address (the file address, the granular print data, and the thumbnail image data). Further, in the case for example where the designated address is the document directory address, all of the directory addresses and files included in this address are deleted from the storage device 26. Further, in the case for example where the designated address is the file address, all of the files corresponding to this address are deleted from the storage device 26.

The process of step S56 of FIG. 5 is executed by the series of processes from step S112 to step S114. In the case where the print data corresponding to the designated address is currently being printed in the process described above, the controller 30 may execute the DELETE process of step S114 after ordering the printing device 38 to complete printing the print data.

Figure 16:
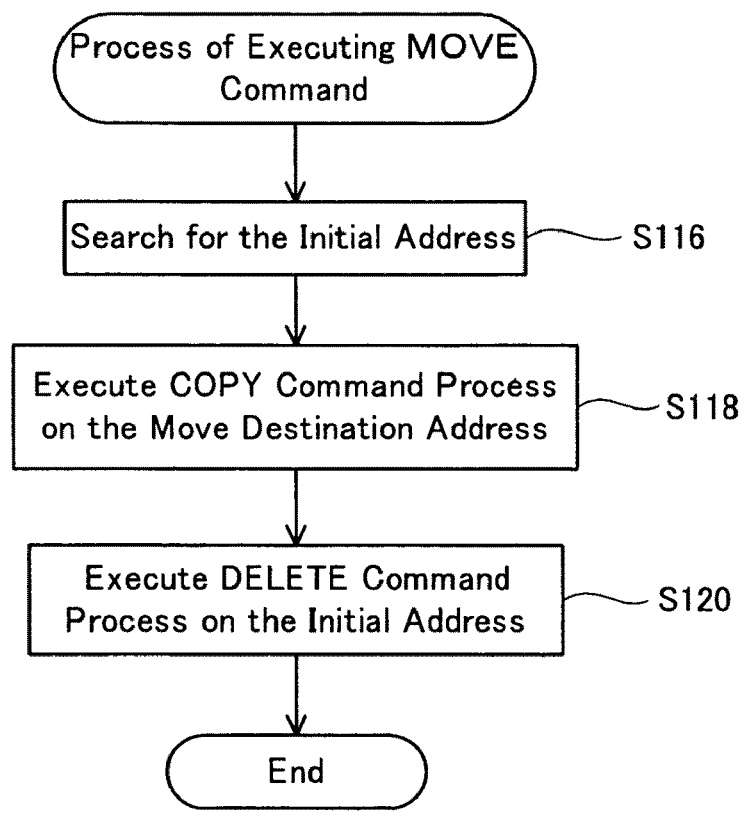
FIG. 16 is a flow chart showing an outline of a process of executing the MOVE command.

In step S46 of FIG. 5, it is determined whether a MOVE command has been received. In the case where the MOVE command has been received (YES in step S46), the controller 30 executes a MOVE command process (step S58). Specifically, a sub routine shown in FIG. 16 is executed in step S58. FIG. 16 is a flow chart showing an outline of the process of executing the MOVE command. When the MOVE command has been received, the controller 30 searches for a move initial address designated in the MOVE command (step S116). Next, a COPY process is executed on the designated move destination address so that a job or print data mapped to the designated move initial address is a superior address (step S118). In this step, the COPY command process is executed with the move initial address as the copy initial address and the move destination address as the copy destination address (see FIG. 14).

In step S120, when the COPY process has been executed, the DELETE process is executed on the move initial address and the file corresponding to the move initial address. In this step, the DELETE command process is executed with the move initial address designated as the address to be deleted (see FIG. 15). The process of step S58 of FIG. 5 is executed by the series of processes from step S116 to step S120.

As shown in step S36 of FIG. 5, the MOVE process is also executed in the case where the controller 30 has been notified from the printing device 38 that printing of the job has been completed. In this case, the job directory address of the job whose printing has been completed (the job directory address in which the active directory address is the superior address) is designated as the move initial address, the history directory address is designated as the move destination address, and the aforementioned MOVE process is executed.

In step S48 of FIG. 5, it is determined whether another command has been received. In the case where another command has been received (YES in step S48), a command process corresponding to that command is executed (step S60). For example, if a command for retrieving printer information concerning a print setting, etc. has been received, the controller 30 sends the information set in the printing device 38 to the information processing device 2. Alternatively, if a management command ordering maintenance of the printer has been received, the controller 30 executes the maintenance of the printing device 38. In the case where management commands sent utilizing the WebDAV protocol are received, the processes designated by the commands are executed on the data corresponding to the designated addresses.

With the printer 4 of the present embodiment, when the job creating command is sent from the information processing device 2, the print data is stored in the storage device 26 as a file in which the temp directory address is the superior address. The information processing device 2 utilizes the address data that was retrieved utilizing the PROPFIND command to display the file (or a directory included in the file) as an object in the display device 20. The user can learn, from the objects displayed and the hierarchical structure shown by the objects, which kind of job is being ordered by the printer 4 or the status information of the job whose printing he has ordered. It is thus easy to know the printing orders executed on the printer 4.

Further, with the printer 4 of the present embodiment, the print data whose transmission to the printer 4 has been completed can easily be managed as a job to be printed by means of operating the object that is being displayed at the information processing device 2 side. For example, by operating the operation device 22 to execute the copy, delete, move, etc., processes on the object, the user can execute desired job management orders such as a process to increase a number of print copies of the print data whose transmission to the printer 4 has been completed (the COPY command), a process to cancel printing (the DELETE command), a process to change the order of printing (the MOVE command), etc.

Specific examples were described in detail above, however these are simply illustrations. The specific examples illustrated above include various modifications and changes. For example, in the embodiment set forth in the present specification, the job creating command is sent to the printer as a command created by the printer driver program of the information processing device 2. However, the method of sending the job creating program is not restricted to this method. For example, the printer 4 may be provided with the printer driver program. In this case, the information processing device 2 can send the job creating command and the print data to the printer 4 utilizing the WebDAV protocol.

The characteristics of the embodiment described above will be described below. An information processing device may be capable of displaying a job directory object or a file object by using the job directory address or the file address sent by an address sending device of a printer. The user may execute operations on these objects that are being displayed at the information processing device side. For example, the user can execute operations such as delete, copy, move, click, etc. In the case where a file sharing protocol is utilized for the information processing device and the printer to communicate, commands that correspond to the operations executed on the objects displayed at the information processing device side (communication commands of the file sharing protocol) may be sent to the printer from the information processing device. For this reason, the printer may comprise a second command receiving device that receives commands sent from the information processing device utilizing the file sharing protocol and addresses that designate the execution of these commands. In this case, the printer may execute processes corresponding to the commands from the information processing device. Examples will be given below of the type of commands and the contents of the processes corresponding thereto.

The storage device of the printer may store a predetermined directory address. The "predetermined directory address" may be stored in advance in the storage device, or may be created by the printer each time the printer is activated, or each time the printer is connected with the information processing device, and stored in the storage device. A job directory creating device may create a job directory address in which the predetermined directory address stored in the storage device is its superior address. An address sending device may be capable of sending the predetermined directory address stored in the storage device by using a file sharing protocol. The information processing device can thus display a directory object (may also be termed "superior directory object" below) that corresponds to the predetermined directory address.

Further, in the case where a property retrieving command and the predetermined directory address are received by the second command receiving device, the address sending device may send the received job directory address in which the predetermined directory address is its superior address to the information processing device. The information processing device can thus display the job directory object as a subordinate hierarchy of the superior directory object. Further, in the case where the property retrieving command and a job directory address are received by the second command receiving device, the address sending device may send a file address including the received job directory address as its superior address to the information processing device. The information processing device can thus display the file object as a subordinate hierarchy of the job directory object that is a superior hierarchy thereof.

Moreover, in the case where the property retrieving command has been received, the address sending device may send information other than the address data to the information processing device, such as the sending date or sending destination of the job, the type or the creator of the print data, etc.

In a widely known OS, the property retrieving command may be sent when a directory object is clicked on (or double clicked on) by operating an operation device such as mouse or the like. In the case of this example, when the superior directory object is clicked on (or double clicked on), the information processing device may send the property retrieving command and the directory address (i.e. the predetermined directory address) that corresponds to the superior directory object to the printer using the file sharing protocol. In this case, the printer may send the job directory address having the received predetermined directory address as its superior address to the information processing device (if a plurality of job directory addresses are present, all of these may be sent). When the job directory address has been sent to the information processing device, the information processing device can learn the jobs belonging to the subordinate hierarchy of the directory that corresponds to the superior directory object, and can display the job directory object. The user can thus easily recognize the jobs that belong to the subordinate hierarchy of the superior directory object.

In the case for example where the job directory object is clicked on (or double clicked on), the information processing device may send the property retrieving command and the job directory address that corresponds to the job directory object to the printer using the file sharing protocol. In this case, the printer may send the file address having the received job directory address as its superior address to the information processing device (if a plurality of file addresses are present, all of these may be sent). When the file address has been sent to the information processing device, the information processing device can learn the files belonging to the subordinate hierarchy of the directory that corresponds to the job directory object (i.e. a detailed unit of the print data included in the job), and can display the file object. The user can thus easily recognize the file that belongs to the subordinate hierarchy of the job directory object.

As described above, in the case where a job creating command including print data has been received, the job directory creating device may create a job directory address. In addition, the job directory creating device may create a file for each of the plurality of second print data which are predetermined units that constitutes the first print data, wherein in each of the created files the second print data and the file address that includes the job directory address as its superior address are associated. In this case, the storage device may store the files created by the job directory creating device. Moreover, "the file address and the second print data being associated" may be identical with the job directory address being the superior address of the file address and the second print data (the print data) being associated thereto.

With this configuration, the file address and the second print data may be stored in the storage device in a mapped state. The printer can thus execute various processes on the second print data in accordance with commands from the information processing device. Specific examples thereof are set forth below.

The printer may further comprise a first storage controller. The first storage controller is capable of deleting data from the storage device. The first storage controller executes the following: (1) in the case where a delete command and a job directory address are received by the second command receiving device, the first storage controller deletes the received job directory address and a file of a file address including the received job directory address as its superior address from the storage device, and (2) in the case where the delete command and a file address are received by the second command receiving device, the first storage controller deletes a file of the received file address from the storage device.

After a job creating command has been received by the printer, the cancellation may be desired of a job that is to be executed in accordance with that job creating command, or the cancellation of printing may be desired of a part of the plurality of second print data included in the job. In this case, the user can execute an operation to delete the job directory object or the file object that is being displayed in the information processing device. The delete command and the data of an address for which the delete command is to be executed are sent by means of this operation from the information processing device to the printer using the file sharing protocol.

In the case where, when the delete command has been received from the information processing device, and the address data received with the delete command is the job directory address, the first storage controller deletes the following from the storage device: the received address data and the file in which the aforementioned job directory address is its superior address, i.e. the file address and the second print data. In the case where the address data received with the delete command is the file address, that address data and the second print data included in the aforementioned file address are deleted. At this juncture, the job directory belonging to this file, and other files belonging to the same job directory are not deleted.

With this configuration, the job or the print data ordered by the printer may be cancelled by performing a delete operation on the object being displayed by the information processing device.

The printer may further comprise a second storage controller. In the case where a copy command, a file address, and a copy destination job directory address are received by the second command receiving device, the second storage controller may create and store a file in the storage device, wherein the created file is an association of the second print data mapped to the received file address and a file address including the received copy destination job directory address as its superior address.

After a job creating command has been received by the printer, one may want to increase the number of print copies of the second print data included in a job that is to be executed in accordance with that job creating command. In this case, the user can execute an operation in the information processing device to copy the file corresponding to the second print data whose number of print copies one wants to increase. The copy command, the file address for which the copy command is to be executed, and the job directory address of the copy destination are sent by means of this operation from the information processing device to the printer using the file sharing protocol.

In the case where the second storage controller has received the copy command from the information processing device, the file creating device may create a file of the second print data mapped with the file address received with the copy command, a new file address of that file having the job directory of the copy destination as the superior directory, and store this in the storage device. A plurality of files mapped to the same second print data may be formed, and the number of print copies can thus be increased.

With this configuration, the number of print copies of the print data can be increased by performing the copy operation on the object that is being displayed by the information processing device.

The printer may further comprise a third storage controller and a printing device. In this case, the address sending device may be capable of sending the first directory address and the second directory address that are being stored in the storage device to the information processing device by using the file sharing protocol. The job directory creating device may create a job directory address including the first directory address as its superior address. In the case where a copy command, a job directory address, and the second directory address as a copy destination are received by the second command receiving device, the third storage controller may create and store the following in the storage device: (1) a job directory address including the received second directory address as a copy destination as its superior address; and (2) a file for each file of file addresses stored in the storage device and including the received job directory address as its superior address, wherein each of the created files is an association of the second print data of the file and a file address including the created job directory address of (1) as its superior address. In this case, the printing device may print the second print data mapped to the file addresses that include the second directory address as the superior address. That is, the printer may not print the second print data mapped to the file addresses including the first directory address as the superior address.

The first directory address and the second directory address may be stored in advance in the storage device, or may be created by the printer each time the printer is activated, or each time the printer is connected with the information processing device, and stored in the storage device. When the printer receives the job creating command, the job directory creating device first may create a job directory address in which the first directory address is its superior address. That is, a hierarchical relationship of the first directory and the job directory may be organized.

The address sending device is capable of sending the first directory address and the second directory address stored in the storage device to the information processing device by using a file sharing protocol in the same manner as the job directory address and the file address. The information processing device can thus display a directory object (termed "first directory object" below) that corresponds to the first directory address and a directory object (termed "second directory object" below) that corresponds to the second directory address.

The printer prints the second print data that is mapped to the file address in which the second directory address is the superior address, and does not print files in which the first directory address is the superior address. As described above, the job directory address created by the job directory creating device has the first directory address as the superior address. As a result, files (second print data) in which that job directory address is the superior address also have the first directory address as the superior address. Consequently, printing thereof is not executed immediately even if the job creating command is sent to the printer. The user can add a management operation (cancel, copy, move, etc.) to the job directory object or the file object before printing is executed. In the case where printing is to be executed, the user can copy the job directory object belonging to the first directory object to the second directory object. The third controller thus creates a new job directory address for printing (a job directory address having the second directory address as the superior address) by means of the process (1) above. Further, the third controller creates a file (second print data) having the new job directory address as the superior address. The second print data of the file is thus printed by the printing device. Moreover, "copy" above is a concept that includes "move". This is because the "copy" operation is executed in the "move" operation, i.e. data is copied to a copy destination and then this data is deleted from a copy initial address.

The storage device may be capable of further storing a third directory address. In this case, the address sending device is capable of sending the third directory address stored in the storage device to the information processing device by using the file sharing protocol. The printer may further comprise a fourth storage controller wherein, in the case where the printing device has completed the printing of the second print data, the fourth storage controller creates and stores a file in the storage device, the created file being an association of the printed second print data and a file address including the third directory address as its superior address.

As described above, the printer prints the file (second print data) that belongs to the job directory in which the second directory address is the superior address. With this configuration, the file that is an association of the printed second print data and the file address including the third directory address as its superior address (termed "post-printing file" below) is newly created. The third directory address can be sent from the address sending device to the information processing device. As a result, the information processing device can display the directory object corresponding to the third directory address (termed "third directory object" below). The post-printing file has the third directory address as its superior address. Consequently, the information processing device can display a post-printing file object corresponding to the post-printing file as a subordinate hierarchy of the third directory object. That is, the print history of the printer can be displayed. Further, the user may copy the post-printing file object being displayed by the information processing device into the second directory object. In this case, the second print data of the post-printing file is reprinted.

The predetermined unit, in the plurality of predetermined units of print data that comprise the print data, may be a print page. For example, if the print data is document data, the print data can be divided into smaller print data when a page feed command included in the print data is displayed, or each time there is a cue in which a head of a page is recognized. In this case, the print data for three pages consists of three pieces of second print data. Moreover, the predetermined units may be a unit other than a print page. For example, a plurality of pages may form the predetermined unit.

The file sharing protocol may be a WebDAV protocol (Web Distributed Authoring and Versioning). Alternatively, the file sharing protocol may be a different file sharing protocol.

Furthermore, with the printer having the aforementioned characteristics, a job directory address may be created, and a document directory address may have the job directory address as its superior address may be created, and a file address having the document directory address as its superior address may be created, in the case where the job creating command is received.

Moreover, in the case where the printer receives the delete command and the job directory address, the printer may delete the job directory having the received job directory address from the storage device.

Furthermore, in the case where the printer receives the copy command, the job directory address, and the directory address of the copy destination, the printer (1) may create a job directory address having the received directory address of the copy destination as its superior address, and (2) may create a job directory in which print data associated with the received job directory address is associated with the job directory address created in (1), and may store this in the storage device.

What is claimed is:
1. A printer to be connected with an information processing device in a communicable manner, the printer comprising:
 a storage device;
 a processing unit;
 memory having executable instructions stored thereon that, when executed by the processing unit, cause the processing unit to function as:

a first command receiving device that receives a job creating command including first print data, the first print data including a plurality of second print data;

a job directory creating device that creates a job directory address in a case where the job creating command is received by the first command receiving device, and creates a file address for each of the plurality of second print data included in the first print data, each of the created file addresses including the created job directory address as its superior address, wherein the job directory address and the file addresses created by the job directory creating device are stored in the storage device;

an address sending device configured to send the job directory address and the file addresses stored in the storage device to the information processing device by using a file sharing protocol; and a second command receiving device that receives a command and an address upon which the command is to be executed, wherein the storage device further stores a predetermined directory address, the job directory creating device creates a job directory address including the predetermined directory address as its superior address in the case where the job creating command is received by the first command receiving device, the address sending device is configured to send the predetermined directory address to the information processing device by using the file sharing protocol, and in a case where a property retrieving command and the predetermined directory address are received by the second command receiving device, the address sending device sends the job directory address including the predetermined directory address as its superior address, and in the case where the property retrieving command and a job directory address are received by the second command receiving device, the address sending device sends a file address including the received job directory address as its superior address.

2. The printer as in claim 1, wherein the job directory creating device associates, for each of the plurality of second print data included in the first print data, the second print data and the file address including the created job directory address as its superior address, and the storage device stores, for each of the plurality of second print data included in the first print data, the second print data and the file address associated with the second print data.

3. The printer as in claim 2, wherein the job directory creating device creates a file for each of the plurality of second print data included in the first print data, wherein each of the created files is an association of the second print data and the file address including the created job directory address as its superior address, and the storage device stores the files created by the job directory creating device.

4. The printer as in claim 3, wherein the memory has further executable instructions stored thereon that, when executed by the processing unit, cause the processing unit to function as a storage controller, wherein (1) in a case where a delete command and a job directory address are received by the second command receiving device, the first storage controller deletes the received job directory address and a file of a file address including the received job directory address as its superior address from the storage device, and (2) in the case where the delete command and a file address are received by the second command receiving device, the storage controller deletes a file of the received file address from the storage device.

5. The printer as in claim 3, wherein the memory has further executable instructions stored thereon that, when executed by the processing unit, cause the processing unit to function as a storage controller, wherein in a case where a copy command, a file address, and a copy destination job directory address are received by the second command receiving device, the storage controller creates and stores a file in the storage device, wherein the created file is an association of the second print data associated with the received file address and a file address including the received copy destination job directory address as its superior address.

6. The printer as in claim 3, further comprising:

a printing device, wherein the memory having executable instructions stored thereon that, when executed by the processing unit, further cause the processing unit to function as a first storage controller, the storage device is configured to store a first directory address and a second directory address, the address sending device is configured to send the first directory address and the second directory address to the information processing device by using the file sharing protocol, the job directory creating device creates a job directory address including the first directory address as its superior address in the case where the job creating command is received by the first command receiving device, in the case where a copy command, a job directory address, and the second directory address as a copy destination are received by the second command receiving device, the first storage controller creates and stores the following in the storage device:

(1) a job directory address including the second directory address as its superior address; and (2) a file for each file of file addresses including the received job directory address as its superior address, wherein each of the created files is an association of the second print data associated with the file address including the received job directory address as its superior address, and a file address including the created job directory address of (1) as its superior address, and the printing device prints the second print data included in the files of file addresses including the second directory address as its superior address.

7. The printer as in claim 6, wherein the memory has further executable instructions stored thereon that, when executed by the processing unit, cause the processing unit to function as a second storage controller, wherein the storage device is configured to further store a third directory address, the address sending device is configured to send the third directory address to the information processing device by using the file sharing protocol, and in a case where the printing device completes the printing of the second print data, the second storage controller creates and stores a file in the storage device, wherein the created file is an association of the printed second print data and a file address including the third directory address as its superior address.

8. The printer as in claim 1, wherein the first print data is to be divided into the plurality of second print data in a print page unit.

9. The printer as in claim 1, wherein the file sharing protocol is a WebDAV protocol.

10. A non-transitory computer readable medium for a printer to be connected with an information processing device in a communicable manner, the computer readable medium including instructions that, when executed, order a computer mounted on the printer to:
   create a job directory address including a predetermined directory address as its superior address in the case where a job creating command including first print data is received;
   create a file address for each of a plurality of second print data included in the first print data, each of the created file addresses including the created job directory address as its superior address;
   send the created job directory address and the created file addresses to the information processing device by using a file sharing protocol;
   send the predetermined directory address to the information processing device by using the file sharing protocol;
   send the job directory address including the predetermined directory address as its superior address in a case where a property retrieving command and the predetermined directory address are received; and
   send a file address including the received job directory address as its superior address in the case where the property retrieving command and a job directory address are received.

11. A printer to be connected with an information processing device in a communicable manner, the printer comprising:
   a storage device that stores a first directory address and a second directory address;
   a processing unit;
   memory having executable instructions stored thereon that, when executed by the processing unit, cause the processing unit to function as:
      a first command receiving device that receives a job creating command including first print data, the first print data including a plurality of second print data;
      a job directory creating device that creates a job directory address in a case where the job creating command is received by the first command receiving device, the created job directory address including the first directory address as its superior address, and creates a file address for each of the plurality of second print data included in the first print data, each of the created file addresses including the created job directory address as its superior address;
      an address sending device configured to send an address stored in the storage device to the information processing device by using a file sharing protocol;
      a second command receiving device that receives a command and an address upon which the command is to be executed, wherein the command and the address are sent from the information processing device by using the file sharing protocol; and
      a storage controller; and
   a printing device,
   wherein
   the job directory creating device further creates a file for each of the plurality of second print data included in the first print data, wherein each of the created files is an association of the second print data and the file address including the created job directory address as its superior address,
   the storage device further stores the job directory address, the file addresses and the files created by the job directory creating device,
   the address sending device sends the first directory address, the second directory address, the job directory address, and the file addresses to the information processing device by using the file sharing protocol,
   in a case where a copy command, a job directory address, and the second directory address as a copy destination are received by the second command receiving device, the storage controller creates and stores the following in the storage device:
      (1) a job directory address including the second directory address as its superior address; and
      (2) a file for each file of file addresses including the received job directory address as its superior address, wherein each of the created files is an association of the second print data associated with the file address including the received job directory address as its superior address, and a file address including the created job directory address of (1) as its superior address, and
   the printing device prints the second print data included in the files of file addresses including the second directory address as its superior address.

* * * * *